F. S. CROWELL.
LIGHTING FIXTURE.
APPLICATION FILED MAY 27, 1912.
1,059,441.
Patented Apr. 22, 1913.
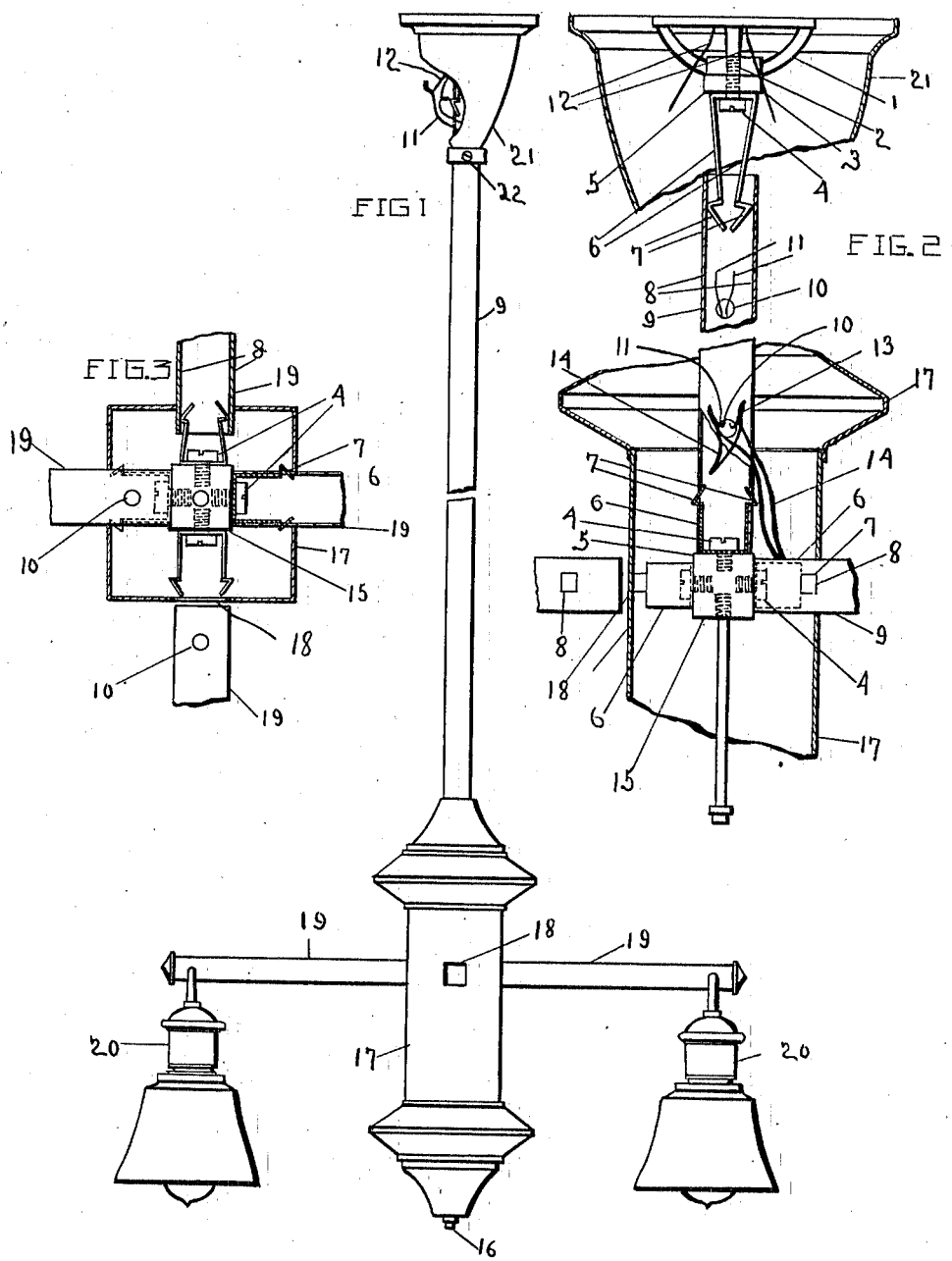

UNITED STATES PATENT OFFICE.

FRANK S. CROWELL, OF TOLEDO, OHIO.

LIGHTING-FIXTURE.

1,059,441.  Specification of Letters Patent.  Patented Apr. 22, 1913.

Application filed May 27, 1912. Serial No. 699,913.

*To all whom it may concern:*

Be it known that I, FRANK S. CROWELL, a citizen of the United States, residing at Toledo, Lucas county, Ohio, have invented a new and useful Lighting-Fixture, of which the following is a specification.

This invention relates to lighting fixtures, especially the construction and assembling thereof.
This invention has utility when embodied in chandeliers.

Referring to the drawing: Figure 1 is an elevation of an electrolier embodying features of the invention; Fig. 2 is a fragmentary view thereof on an enlarged scale; and Fig. 3 is a fragmentary transverse section through the radiating arm portion of the structure.

The ceiling connection is shown as embodying the spider 1 having the central threaded portion 2 against which may seat the supporting element 3 to be held in position by the bolt 4. With the bolt 4 provided with a pipe thread, this mounting of the supporting element 3 may be directly upon a gas pipe. This supporting element 3 has a seat 5. The bolt 4 in mounting the supporting element 3 simultaneously attaches to said element 3 the yieldable or spring holding clips 6 having angular shoulders 7 movable into interlocking engagement with the openings 8 in the shell element or ornamental section 9 of the fixture herein shown as of rectangular cross section and tubular. Adjacent the upper end of the shell part 9, if not actually at the end thereof, is lateral opening 10 through which the leads or electric conducting lines 11 may extend to be connected to the supply wires or lines 12 brought in through the spider 1. In assembling the shell element 9, the inclined ends of the clip 6 in the direct motion of the element 9 toward the supporting element 3, force the sides of the clip 6 toward each other into the shell element 9 and the continuation of this one-direction assembling movement brings the shell element into positive locked assembled position by having the seat terminal portion of the shell element 9 abut the seat 5 simultaneously with the engagement of the shoulders 7 into the lateral seats or openings 8 in the shell element 9.

The leads or conducting lines 11 are brought out of the opening 10 in the portion of the shell element remote from the supporting element 3 and connected by joint 13 with the branches 14 to the several arms of the fixture in a similar manner to the passage of the leads through the shell element 9. The shell element 9 is connected to the supporting element 15 by a one-direction clip assembly means similar to that connecting the element 9 to the spider 1. This supporting element 15 has threaded openings on the several sides thereof of similar size. In four armed construction this supporting element 15 is a cube and may be assembled with any side coacting with the shell element 9. The opposite side carries the rod 16 to mount the centrally ornamenting shell element 17 in position about the supporting element 15 to form a housing therefor. This housing 17 has lateral openings 18 of contour to fit the rectangular radiating arms 19. Adjustment of rod 16 brings these openings 18 into alined position with the radiating arms 19 from the supporting element 15 so that nonrotating direct inward pushing of the radiating arms 19 at once locks these arms in the rigid assembled relation with the supporting element 15. The leads 14 may then be threaded out of the lateral openings 10 in the arms for proper connection in conducting electricity to the lamps 20 carried by the radiating arms 19. These openings 10 in the shell elements or arms 19 are similar to the openings 10 in the element 9. A housing 21 is held in assembled position by the set screw 22 over the mounting spider 1.

The device is of exceptional value due to the lightness of construction permissible and retention of a rigid construction readily adaptable to varying styles and most stylish in appearance. Further, in shipping the device may be sent knock-down in compact form not susceptible to breakage and at a reduced freight rate. The wiring may occur conveniently at destination individually for the arms or shell elements of the fixture with the possible rapid assembling of the structure by the one direction movements, connecting up of the wiring and the assembled electrolier even of considerable proportions handled by one man in taking up to mounting position and the single one direction action forces the same into the positive locked mounted position upon the ceiling. The fact that chandeliers so frequently involve features of considerable spread lends great importance to this one direction thrusting of the parts into locked position. In the event that it should be desired to knock-down the structure, removal of housing 21 permits of ready forcing of the shoulders 7 inward to permit withdrawal of the shell element 9 as to its connection with the spider 1. Similarly the shoulders 7 coacting between the arms 19 and element 15 may be forced inwardly by removing the top hood of the housing section 17 for releasing the radiating arms.

What is claimed and it is desired to secure by Letters Patent is:

1. A lighting fixture comprising a shell element forming a duct having a lateral outlet therein near its end, a supporting element for the shell element, said supporting element having shell element engaging means and a seat for abutting the end of the shell element, a conducting line for the fixture passing out of the outlet to by-pass the supporting element, and a lamp support to which said line extends, said element forming the sole support for said lamp support.

2. A lighting fixture comprising a shell element forming a duct having an outlet near its end, a supporting element for the shell element, one of said elements being provided with a shoulder and a yielding clip, and the other element being provided with a clip receiving recess and a shoulder abutting seat, said elements by direct movement toward each other being assembled into rigid locking relation by the clip and shoulder engagement, a conducting line passing out of the outlet adjacent the supporting element, and a lamp support to which said line extends, said shell element forming the sole support for said lamp support.

3. A lighting fixture comprising a shell element forming a duct having an outlet near its end, a relatively non-rotatable supporting element for the shell element, one of said elements being provided with a shoulder and a yielding clip, and the other element being provided with a clip receiving recess and a shoulder abutting seat, said elements by direct movement toward each other being assembled into rigid locking relation solely by the clip and shoulder engagement, a conducting line through said outlet adjacent the supporting element, and a lamp support to which said line extends.

In testimony whereof I affix my signature in the presence of two witnesses.

FRANK S. CROWELL.

Witnesses:
C. H. RAUCH,
H. McKECHINE.

Copies of this patent may be obtained for five cents each, by addressing the "Commissioner of Patents, Washington, D. C."